Sept. 2, 1969         G. SCHAEFFLER         3,464,745

BALL BEARING FOR LONGITUDINAL MOVING SHAFTS

Filed Nov. 14, 1967         2 Sheets-Sheet 1

Inventor:
GEORG SCHAEFFLER
BY
Hammond and Littell
ATTORNEYS

United States Patent Office 3,464,745
Patented Sept. 2, 1969

3,464,745
BALL BEARING FOR LONGITUDINAL MOVING SHAFTS
Georg Schaeffler, Herzogenaurach, Germany, assignor to Industriewerk Schaeffler OHG, Herzogenaurach, Germany, a corporation of Germany
Filed Nov. 14, 1967, Ser. No. 682,887
Claims priority, application Germany, Nov. 15, 1966, J 32,242
Int. Cl. F16c 29/06, 19/04
U.S. Cl. 308—6                  3 Claims

ABSTRACT OF THE DISCLOSURE

A ball bearing for the mounting of shafts having longitudinal motion consisting of a thin-walled cylindrical sheet metal race and a guide sleeve arranged in concentric relation thereto and which has a plurality of ball guides distributed about its circumference, the ball guides consisting of two linear guiding zones running parallel to the bearing axis and two semi-circular guiding zones connecting the linear guiding zones.

Prior art

Figure 1:
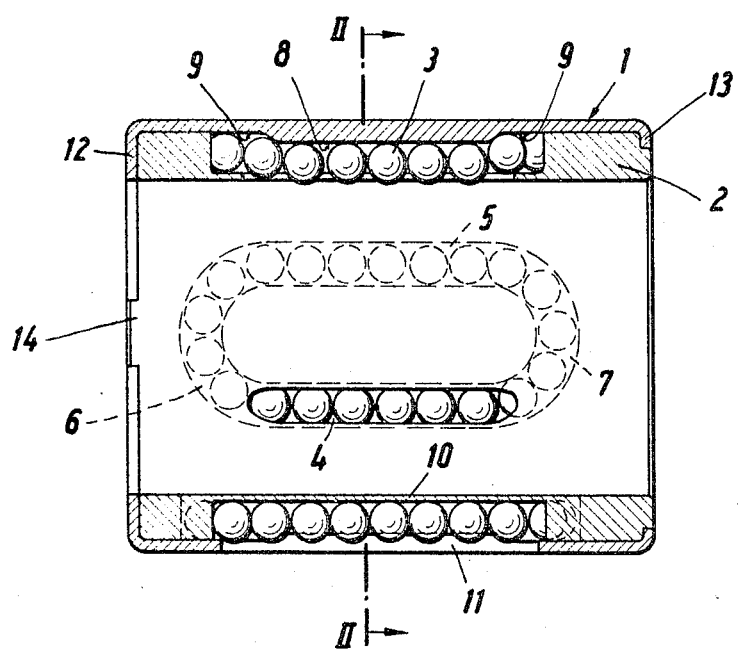

Ball bearings of this type serve as a low friction support for shafts which are intended to execute longitudinal motions without being subjected to rotary motion. Because the balls in these bearings rotate within closed oval guide zones, the longitudinal motion of the shafts in these bearings is unlimited.

There are a wide variety of forms of construction of these bearings. In one known design as shown in Swiss Patent No. 253,779, the cylindrical race is formed as a rigid element having in its bore several longitudinal slots distributed about its circumference, which slots serve to return the balls to the portion of the guides without stress or load. In this type of construction, the race has at its ends within the area of these semi-circular guiding zones a bore diameter greater than the middle portion whereby the balls can turn around in the area of the semi-circular guiding zones. This bearing construction leads to a perfectly functioning bearing but is expensive to produce because the longitudinal slots and the enlarged race diameters require a relatively long working time and a machining process.

In another known embodiment illustrated in U.S. Patent No. 2,503,009, the race is provided in the area of the guiding zones wherein the balls are to be turned around without load with a passing through longitudinal slot having a width so that the balls can partially pass therethrough. In this bearing, the race itself is not truly cylindrical but the oval ball guides are fitted into its surface. This construction not only requires expensive tools but has the additional disadvantage that the race comes into contact with a stator bore only at a few points when inserted therein and, therefore, does not guarantee a secure fitting.

Another known bearing shown in DAS No. 1,194,649 uses a smooth cylindrical race into which passing through slots have been punched to permit partial passage of the balls therethrough. The passing through slots have a C-shape. This bearing has the disadvantage that upon hardening of the race, the flanges forming the C-shaped slots of the race are subject to distortion whereby the balls cannot roll smoothly in their guiding zones in the assembled bearing but become partially obstructed therein.

Objects of the invention

It is an object of the invention to provide a novel ball bearing for mounting shafts having longitudinal motion which are simply constructed, yet function perfectly.

It is another object of the invention to provide a novel ball bearing for mounting shafts having longitudinal motion which have as small exterior dimensions as possible.

These and other objects and advantages of the invention will become obvious from the following detailed description.

The invention

The ball bearing of the invention for mounting shafts having longitudinal motion is comprised of a thin-walled, exteriorly smooth, cylindrical sheet metal race and a guide sleeve arranged in concentric relation thereto having a plurality of ball guides distributed about its circumference, the ball guides consisting of two linear guiding zones running parallel to the bearing axis and two semi-circular guiding zones connecting the linear guiding zones, the race diameter being greater at both axial ends in the area of the semi-circular guiding zones than in the middle and the race being provided with a passing through longitudinal slot having a width slightly less than the ball diameter within the area of only one of the linear guiding zones of a ball guide.

Because the race has a true cylindrical shape, no expensive tools are necessary for the non-cutting steps and no prolonged machining step is required which simplifies production and reduces costs. The formation of the passing through longitudinal slot in the thin-walled race can be easily effected by punching and the bore of the race can be merely enlarged without a costly stamping process for the turning of the balls in the area of the semi-circular guiding zones. While some of the said features are known to the art, the novel combination of the individual features to produce a novel bearing having all of the advantages of the known bearings without any of their disadvantages is not known.

Furthermore, the race itself may be produced in a non-cutting fashion to obtain the increase of the diameter within the area of its ends by non-cutting shaping. Particularly, these measures make possible a very simple and inexpensive production of the bearings without a machining step, particularly when the guide sleeve disposed in the race is produced in well known manner as a simple plastic molded body, making it possible to produce a perfectly functioning bearing in the simplest and the least expensive manner for mass production.

Figure 2:
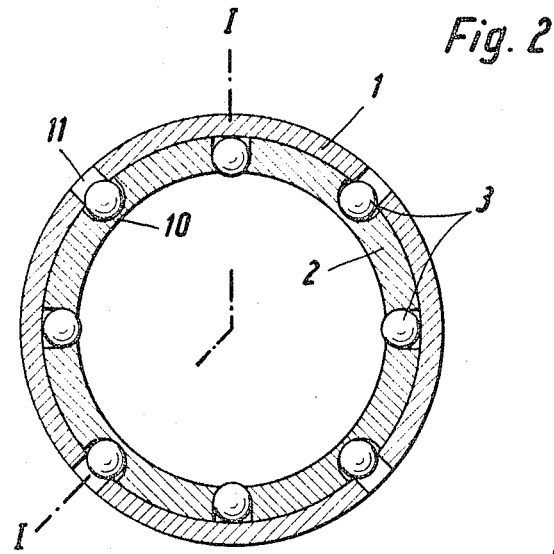
Figure 3:
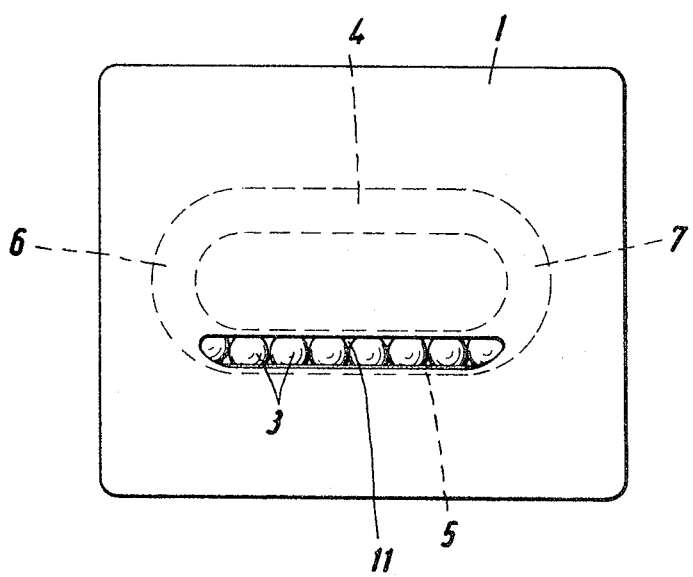

Referring now to the drawings:
FIG. 1 is a longitudinal cross-section through one bearing embodiment of the invention.
FIG. 2 is a cross-section of the bearing of FIG. 1 taken along the line II—II.
FIG. 3 is an exterior view of the bearing of FIG. 1.

The bearing illustrated in the figures is comprised of a cylindrical race 1 and bearing sleeve 2 disposed therein which together form guides for the balls 3. These bearing guides consist of two linear guiding zones or tracks 4 and 5 arranged in a parallel relationship to the axis of the bearing and of two semi-circular guiding zones 6 and 7 connecting the elements 4 and 5. The bearing sleeve 2 is provided with longitudinal slots within the area of zone 4 which makes it possible for the balls 3 to partially pass inwardly as shown in the upper half of FIG. 1. This is realized in the upper half of FIG. 1. While passing through guiding zone 4, the balls 3 are capable of transmitting any load. Here the balls roll on the raceway surface 8 of the race 1. The race 1 is expanded at both its ends within the area of the semi-circular guiding zones 6, 7, to the larger diameter 9, which make lifting of the balls 3 possible, so as to guide them subsequently into the next linear guiding zone 5, wherein the balls roll back free of load. The lower part of FIG. 1 clearly illustrates that the balls in guiding zone 5 are covered inwardly by the partition 10 of the guide sleeve 2. In this area, the race 1 is provided with a passing through longitudinal slot 11, which makes possible the partial passage of the balls therethrough.

FIG. 3 shows one form of slot 11 seen from above. Depending upon the shape of the guide sleeve 2 within the area of the semi-circular guiding zones 6 and 7, the shape of slot 11 is correspondingly adapted.

The race 1 is provided at its ends with radially, inwardly directed flanges 12 and 13, which combine the race and guide sleeve into a single unit. To prevent an oppositely directed rotation of these two members, the guide sleeve 2 is provided with a projection 14 which engages a corresponding recess of flange 12 of race 1.

Various modifications of the bearing of the invention may be made without departing from the spirit or scope thereof and it is to be understood that the invention is to be limited only as defined in the appended claims.

I claim:

1. A ball bearing for mounting shafts having longitudinal motion comprising a thin-walled, exteriorly smooth, cylindrical sheet metal race and a guide sleeve arranged in concentric relation thereto having a plurality of ball guides distributed about its circumference, the ball guides consisting of two linear guiding zones running parallel to the bearing axis and two semi-circular guiding zones connecting the linear guiding zones, the race diameter being greater at both axial ends in the area of the semi-circular guiding zones than in the middle and the race being provided with a passing through longitudinal slot having a width slightly less than the ball diameter within the area of one of the linear guiding zones of a ball guide.

2. The bearing of claim 1 wherein the race is formed without cutting and the increase of the diameter of the race at its ends is formed without cutting.

3. The bearing of claim 1 wherein the guide sleeve is provided with a projection which engages a recess of the race.

References Cited

UNITED STATES PATENTS

| 2,559,292 | 7/1951 | Ferger. |
| 3,042,459 | 7/1962 | Magg. |
| 3,357,754 | 12/1967 | Betrix. |

FOREIGN PATENTS

| 1,316,948 | 12/1963 | France. |

MARTIN P. SCHWADRON, Primary Examiner

LUCIOUS L. JOHNSON, Assistant Examiner